(12) United States Patent
Bozionek et al.

(10) Patent No.: US 8,170,188 B2
(45) Date of Patent: May 1, 2012

(54) METHOD AND ARRANGEMENT FOR PROVIDING A COMMUNICATION IN A COMMUNICATION SYSTEM

(75) Inventors: Bruno Bozionek, Borchen (DE); Karl Klaghofer, München (DE); Holger Prange, München (DE); Michael Tietsch, Kaufering (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 959 days.

(21) Appl. No.: 12/218,473

(22) Filed: Jul. 15, 2008

(65) Prior Publication Data
US 2009/0067598 A1    Mar. 12, 2009

(30) Foreign Application Priority Data
Sep. 11, 2007  (EP) .................................. 07017799

(51) Int. Cl.
*H04M 15/00* (2006.01)
(52) U.S. Cl. ........... 379/114.01; 379/114.1; 379/144.02; 379/210.01

(58) Field of Classification Search .................. 379/67.1, 379/210.01, 100.04, 114.01, 114.05, 114.1, 379/114.2, 114.17, 114.21, 144.02, 144.05, 379/144.07, 144.08; 455/406, 408; 705/14.1
See application file for complete search history.

(56) References Cited

U.S. PATENT DOCUMENTS

| | | | |
|---|---|---|---|
| 5,740,229 A * | 4/1998 | Hanson et al. | 379/67.1 |
| 5,774,533 A | 6/1998 | Patel | |
| 6,373,931 B1 | 4/2002 | Amin et al. | |
| 6,999,572 B1 * | 2/2006 | Shaffer et al. | 379/210.01 |
| 2003/0198325 A1 * | 10/2003 | Bayne | 379/114.21 |
| 2005/0141686 A1 | 6/2005 | Matsunaga et al. | |

FOREIGN PATENT DOCUMENTS

EP        0795992 A2    9/1997

\* cited by examiner

*Primary Examiner* — Md S Elahee

(57) ABSTRACT

First information and second information is stored in the communication system for a callback after a first communication terminal attempts a call to a second communication terminal in which the connection is not established. The first information allows the second communication terminal to display the attempted call so that a callback to the first communication terminal can be executed on the part of the second communication terminal. The second information includes a charge type for the callback correlating at least to the attempted call.

20 Claims, 1 Drawing Sheet

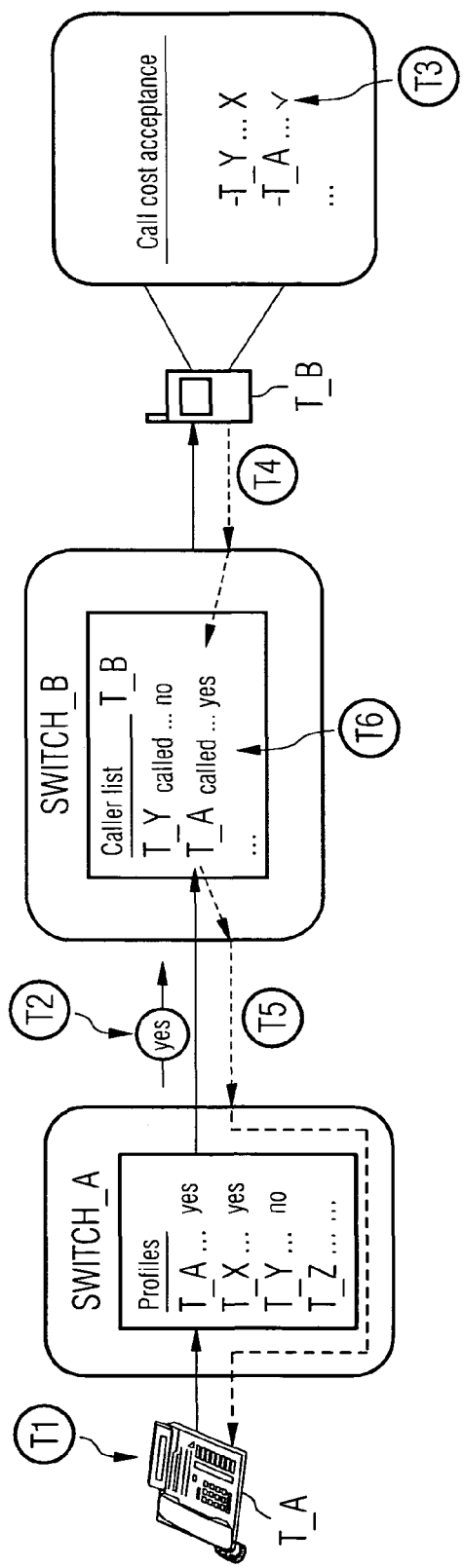

METHOD AND ARRANGEMENT FOR PROVIDING A COMMUNICATION IN A COMMUNICATION SYSTEM

CROSS REFERENCE TO RELATED APPLICATIONS

This application claims priority of European Patent Office application No. 07017799.3 EP filed Sep. 11, 2007, which is incorporated by reference herein in its entirety.

FIELD OF INVENTION

The invention relates to a method for providing a communication in a communication system and an arrangement for providing a communication in a communication system.

BACKGROUND OF INVENTION

In the field of telecommunications it is adequately known that a caller can make use of the "callback" service feature if the called subscriber is not present.

Various implementations are known for this, such as for example "Completion of Calls to Busy Subscribers"/"Completion Call on No Reply" (CCBS/CCNR), which are used with (ISDN) and the ISDN-based QSIG ("Signaling at the Q reference point") protocol.

A callback option is also known from mobile communication, with which missed calls are offered as a menu for a call(back). (High) charges are incurred for the party calling back in mobile communication in particular.

SUMMARY OF INVENTION

The object of the invention is to specify a method and an arrangement, which allow charge-free callback for a party calling back.

This object is achieved by the method and the arrangement as claimed in the independent claims.

With the inventive method for providing a communication in a communication system with at least one first communication terminal and at least one second communication terminal, if the first communication terminal executes a call to the second communication terminal and a request for connection at least to the second communication terminal is present, if the connection is not established, first information is stored in the communication system in such a manner that the second communication terminal displays the call that did not take place, that callback to the first communication terminal can be executed on the part of the second communication terminal, with a charge type for a callback correlating at least to the call on the part of the first communication terminal that was not taken being stored at least temporarily in the communication system as second information and with the callback being calculated on the basis of the second information.

One advantage of the inventive method is the provision of the possibility of more flexible billing in the case of missed calls.

Preferably the first communication terminal will store at least the charge type backward calculation, in other words a collect call, as second information. It is thus possible to eliminate the disadvantage for a called communication terminal of having to bear the costs on callback in the event of a missed call.

If the second information is formed such that the charge type is applied for all callbacks terminating at the first communication terminal, a particularly simple implementation variant results, which also means that the second communication terminal does not have to make a selection and therefore the advantage of non-payment for a callback is always ensured.

Alternatively the second information can be formed such that the charge type for parameters determined on the part of the first communication terminal has an at least temporary period of validity. This development allows the first communication terminal to control costs incurred by it, so that not all incoming calls from the opposite party after an unsuccessful call are evaluated as a callback for the call that was not taken but should be classed and billed as a standard call after a certain time period.

If the first communication terminal alternatively or additionally defines as a parameter the time in which callback takes place on the basis of the charge type stored by means of the second information, the first communication terminal can implement a cost control in a particularly flexible manner, also providing protection against abuse.

In a further development of the inventive method the first communication terminal determines as a parameter at least one second communication terminal, for which a callback initiated by the second communication terminal takes place on the basis of the charge type stored by means of the second information. This allows the cost control to be refined further and to be tailored to individual devices, so that as the user of a first communication terminal it is possible in particular to grant this cost benefit to the individual devices.

If the second information is acquired on the part of the first communication terminal as information input further to the inputting of speed-dial information on the part of the user, in particular confirmation of a special character key, a flexible cost control tailored for each call can be initiated in a particularly simple manner. Also standard terminals are generally configured for this process also known as suffix dialing, so that the inventive method can as a result be implemented advantageously without any major changes to existing systems.

Acquisition hereby preferably takes place within a determined time period so that the user of the first communication terminal does not have to be presented with additional expenditure and implementation is further simplified.

Alternatively or additionally in a development of the invention acquisition can be started and/or terminated by activating a special key. This variant is also generally implemented in standard terminals so that the invention can be executed without further ado. It also offers a user of the first communication terminal a control possibility over the time period, in which acquisition takes place.

Very simple implementation can be achieved if the second information is stored in the first communication terminal.

Alternatively in one development at least the first communication terminal can be incorporated in the communication system by way of a first switching center of the communication system and the first information and/or second information can be stored in the first switching center so that this information can advantageously be managed centrally and there is for example no need for additional storage capacity in the terminals.

This advantage is additionally supported by the development, in which at least the second communication terminal is incorporated in the communication system by way of a second switching center of the communication system and the first and/or second information is stored in the second switching center.

If the first information and the second information is displayed in the second communication terminal, a variant of the invention can be achieved, in which the second communication terminal is given a selection possibility, so that it has control over charging.

In a further advantageous embodiment of the invention storage of the first information and/or second information is terminated after successful callback so that storage capacity becomes free again and can be made available for storing new first and/or second information for example.

Alternatively or additionally it can be advantageous to terminate storage after a determined time period, so that it is also possible to process an instance where callback does not take place.

Alternatively or additionally it is also advantageous, if the second information is transmitted by way of a callback signaling channel to the first switching center and/or second switching center and/or to the second communication terminal. This means that a separate connection is not required and storage can therefore be effected promptly in the context of the call.

BRIEF DESCRIPTION OF THE DRAWINGS

Further advantages and details of the invention are described in more detail below based on an exemplary embodiment illustrated in the FIGURE, in which the FIGURE shows a schematic diagram of an exemplary embodiment of the inventive method and an exemplary embodiment of the arrangement to be implemented.

DETAILED DESCRIPTION OF INVENTION

The FIGURE shows an exemplary embodiment of the inventive method and an exemplary embodiment of the inventive arrangement in a schematic manner, referred to below for simplicity as an exemplary embodiment or example.

A scenario is hereby assumed, which occurs typically an a communication network, namely that a first subscriber T A wishes to set up a connection to a second subscriber T B, with the first subscriber A being shown as a telephone, while the second subscriber T B is embodied as a mobile element in the example shown. However this does not mean that the exemplary embodiment is restricted to these types of devices. Rather all known communication devices, including purely software-based applications providing a telephone function, such as so-called Voice over IP Clients, which use the inventive method, can be deployed as claimed in the invention.

According to the exemplary embodiment of the invention illustrated the inventive method comes into effect as a result of a call initiated at a first time T1 by the first subscriber T A, for which it should be assumed for the application of the invention that the second subscriber T B cannot be reached. Alternatively or additionally the first subscriber A can overwrite the hitherto standard settings for the current call by so-called suffix dialing within a defined time period from time T1, for example as long as the incoming call is signaled, in other words it is ringing at the second subscriber T B.

As shown, the call initiated at the first time T1 triggers a check at a first switching facility SWITCH A, which is assigned to the first subscriber T A, to determine whether a profile table stored in the first switching center SWITCH A contains standard values for cost acceptance, as should be signaled to the second subscriber T B in the event of a callback.

If such an entry for cost acceptance for the first subscriber facility T A is stored at the first switching center SWITCH A, at a second time T2 the information "cost acceptance yes" is added for example as an attribute of call signaling for transmission and is transmitted to a second switching facility SWITCH B, which is assigned to the second subscriber T B. Other signalings, such as the setting of at least one specific bit, in other words a so-called flag, or combinations of such are possible.

The second switching facility SWITCH B can then store this additional attribute as assigned to the first subscriber A in a call list, which has flagged the call from the first subscriber T A, so that when a caller list showing missed calls is displayed the second subscriber T B receives and sees this information as well. As shown in the diagram this is indicated to the second subscriber T B by a check next to the identifier of the first subscriber T A.

At a fourth time T4 the second subscriber can then select the missed call from the first subscriber T A and initiate the desired callback. The second switching facility SWITCH B hereby in turn determines from the attribute "Yes" assigned to the first subscriber T A and stored that cost acceptance has been agreed on the part of the first subscriber T A and at a fifth time T5 initiates a connection, which is set up as a collect call, as soon as the first subscriber T A accepts the call.

At a later sixth time T6 according to the invention the callback list entries can also be deleted again. This can be done for example as soon as a callback has been carried out successfully or in the event of a next successful call from the second subscriber T B to the first subscriber T A, if for example the first subscriber T A could not accept the callback in a first callback attempt. Optionally, in other words alternatively or additionally, such deletion can also be timer-controlled so that the entry in the second switching center SWITCH B can be deleted for example after 24 hours, with this also having to be signaled to the second terminal T B according to the invention, so that it can update its call list accordingly.

Alternatively or additionally to the example illustrated and described, it is also possible for callbacks from the second terminal T B to the first terminal T A generally to be set up as collect calls.

In a further alternative or addition to an embodiment or variant provision can be made for the possibility to be implemented on the part of the first terminal T A that the acceptance of costs for an expected callback from the second terminal TB to the first terminal T A is approved or rejected on the part of the first terminal, it being possible for this decision to be made in particular at an earlier time, in other words to take place alternatively or additionally to the above-mentioned suffix-dialing.

Depending on whether protocol influences are also tolerated or desired on the part of the first terminal T A, this can be implemented alternatively or additionally according to the invention, with analog terminals being excepted from implementation. With this alternative in particular provision can be made for the profile of the first terminal T A to be stored in the first terminal T A or in the first switching facility SWITCH A.

A development that is advantageous for analog terminals consists of operating without influences on signaling, whereby the invention is realized with the "traditional" suffix dialing that is present in analog terminals generally, for example the inputting of a "*", which according to the invention is evaluated as "charge accepted" or the inputting of "#", which is evaluated as "charge not accepted".

The invention claimed is:

1. A method for providing a communication in a communication system comprising:

inputting a charge type for a callback communication from a second terminal to a first terminal at the first terminal, the charge type comprising cost acceptance information of a cost for the callback communication that is to be accepted by the first terminal if the callback communication from the second terminal is completed at the first terminal;

inputting an attribute indicating acceptance of the cost of the callback communication from the second terminal at the first terminal;

the first terminal initiating a first communication to the second terminal, the first communication not being completed at the second terminal;

storing first information about the first communication, the first information indicating the first communication from the first terminal not being completed at the second terminal;

a first switching facility determining second information for the second terminal, the second information comprising the charge type and information based on the inputted attribute accepting the cost of the callback from the second terminal;

the first switching facility transmitting the second information to a second switching facility;

the second switching facility assigning the second information to the first terminal and storing the second information;

the second terminal receiving the second information and the first information and displaying the first information and the second information at the second terminal;

the second terminal initiating the callback communication to the first terminal; and the second switching facility determining whether the cost for the callback communication has been accepted by the second terminal or the first terminal based on the second information.

2. The method of claim 1 wherein inputting the charge type for the callback communication at the first terminal comprises a user of the first terminal inputting the second information prior to the initiating of the first communication to the second terminal.

3. The method of claim 1 wherein the cost acceptance information of the charge type is such that the cost for the callback communication to the first terminal is accepted by the first terminal for all callback communications from the second terminal being completed at the first terminal.

4. The method of claim 1 wherein the cost acceptance information of the charge type is valid for a predetermined amount of time.

5. The method of claim 1 wherein both the first information and the second information are displayed at the second terminal.

6. The method of claim 1 wherein the cost acceptance information of the charge type comprises at least one third terminal from which the user of the second terminal may initiate the callback communication such that the cost for the callback communication is charged to the first terminal if the callback communication is initiated from the at least one third terminal, the at least one third terminal being different from the second terminal.

7. The method of claim 1 further comprising a user of the first terminal inputting the charge type and the attribute as part of speed dialing information or suffix dialing information.

8. The method of claim 1 further comprising a user of the first terminal initiating input of the charge type by activating a special key of the first terminal and the user terminating input of the charge type by activating the special key of the first terminal.

9. The method of claim 1 further comprising at least one of the first terminal and the first switching facility storing the second information.

10. The method of claim 1 wherein the first information is stored in at least one of the first switching facility and the second switching facility.

11. The method of claim 1 further comprising the second terminal providing a selection for control of a charge for the callback communication to the second terminal.

12. The method of claim 1 further comprising the second switching facility deleting the second information following the callback communication being completed at the first terminal or after a predetermined period of time has passed.

13. The method of claim 1 further comprising the first switching facility storing a list of profiles for each terminal of a plurality of terminals, each profile comprising a specified charge type for an individual callback communication from each of the plurality of terminals to the first terminal.

14. The method of claim 1 wherein
the first switching facility transmitting the second information to the second switching facility comprises the first switching facility transmitting the second information via a signaling channel to the second switching facility.

15. The method of claim 14 further comprising the second switching facility transmitting the first information and the second information to the second terminal via the signaling channel.

16. The method of claim 1 wherein the first information comprises an identifier of the first terminal, a time that the first communication was initiated, and an indication that the first communication was not completed at the second terminal.

17. An arrangement for providing a communication in a communication system, comprising:
a first switching facility;
a first communication terminal connected to the first switching facility;
a second switching facility communicatively connected to the first switching facility via a network; and
a second communication terminal; and
the first communication terminal receiving a charge type for a callback communication that is to come from the second communication terminal, the charge type comprising cost acceptance information for a cost of the callback communication from the second communication terminal that is to be accepted by the first communication terminal if the callback communication from the second communication terminal is completed at the first communication terminal;
the first communication terminal receiving an attribute indicating acceptance of the cost of the callback communication from the second communication terminal at the first communication terminal;
the first communication terminal initiating a first communication to the second communication terminal, the first communication not being completed at the second communication terminal;
the second switching facility storing first information about the first communication, the first information indicating the first communication from the first communication terminal not being completed at the second communication terminal;
the first switching facility determining second information for the second communication terminal, the second information comprising the charge type and information based on the inputted attribute accepting the cost of the callback communication from the second communication terminal;

the first switching facility transmitting the second information to the second switching facility;

the second switching facility assigning the second information to an identifier of the first communication terminal and storing the assigned second information;

the second communication terminal receiving the second information and the first information and displaying the first information and the second information at the second communication terminal;

the second terminal initiating the callback communication to the first terminal; and the second switching facility determining whether the cost for the callback communication has been accepted by the second communication terminal or the first communication terminal based on the assigned second information.

18. The arrangement of claim 17 wherein the first communication terminal receives the charge type for the callback communication from the second communication terminal prior to the first communication being initiated to the second communication terminal.

19. The arrangement of claim 17 wherein the cost acceptance information of the charge type comprises at least one additional communication terminal from which a user of the second communication terminal may initiate the callback communication such that the cost for the callback communication is charged to the first communication terminal if the callback communication is initiated from the at least one additional communication terminal, the at least one additional communication terminal being different from the second communication terminal.

20. The arrangement of claim 17 wherein both the first information and second information are displayed at the second communication terminal.

* * * * *